United States Patent
Lee et al.

(10) Patent No.: US 8,760,583 B1
(45) Date of Patent: Jun. 24, 2014

(54) APPARATUS AND METHOD FOR PROCESSING VIDEO SIGNAL

(71) Applicants: TVLOGIC Co., Ltd., Seoul (KR); 3R Global Inc., Seoul (KR)

(72) Inventors: Kyungkook Lee, Seoul (KR); Kyungsug Lee, Seoul (KR)

(73) Assignees: TVLOGIC Co., Ltd., Seoul (KR); 3R Global Inc., Seoul (KR)

( * ) Notice: Subject to any disclaimer, the term of this patent is extended or adjusted under 35 U.S.C. 154(b) by 0 days.

(21) Appl. No.: 14/184,500

(22) Filed: Feb. 19, 2014

(30) Foreign Application Priority Data

Feb. 26, 2013 (KR) .................. 10-2013-0020470

(51) Int. Cl.
*H04N 5/46* (2006.01)
*H04N 5/268* (2006.01)
*G06F 13/38* (2006.01)
*G06F 11/30* (2006.01)

(52) U.S. Cl.
USPC ................ 348/706; 348/558; 710/16; 710/63

(58) Field of Classification Search
CPC ............ H04L 43/0811; H04L 43/0817; G06F 13/4068; G06F 13/385; G06F 13/382; G06F 13/387; H04N 5/44; H04N 5/46; H04N 5/4401
USPC ............ 348/706, 725, 558, 554–556; 710/15, 710/16, 63; 345/156
See application file for complete search history.

(56) References Cited

U.S. PATENT DOCUMENTS

| | | | | | |
|---|---|---|---|---|---|
| 5,461,427 | A | * | 10/1995 | Duffield et al. | 348/555 |
| 5,557,337 | A | * | 9/1996 | Scarpa | 348/558 |
| 5,598,221 | A | * | 1/1997 | Miyahara et al. | 348/554 |
| 6,014,178 | A | * | 1/2000 | Jeon et al. | 348/554 |
| 6,072,541 | A | * | 6/2000 | Song | 348/706 |
| 6,091,458 | A | * | 7/2000 | Jeon et al. | 348/554 |
| 6,501,510 | B1 | * | 12/2002 | Moon | 348/553 |
| 7,563,129 | B2 | * | 7/2009 | Chen | 439/498 |
| 2006/0154629 | A1 | * | 7/2006 | Zahm et al. | 455/136 |
| 2007/0296862 | A1 | * | 12/2007 | Terada | 348/558 |

* cited by examiner

*Primary Examiner* — Victor Kostak
(74) *Attorney, Agent, or Firm* — Stein IP, LLC

(57) ABSTRACT

Provided are a video signal processing apparatus and a video signal processing method capable of automatically recognizing whether an input video signal is an analog video signal or a digital video signal and processing the input video signal accordingly. According to the video signal processing apparatus and method, the input signal can be processed appropriately so that a display device can display a video or a video storage device can store a video data even when it is not known whether the input signal is an analog signal or a digital signal.

20 Claims, 2 Drawing Sheets

APPARATUS AND METHOD FOR PROCESSING VIDEO SIGNAL

CROSS-REFERENCE TO RELATED PATENT APPLICATION

This application claims the benefit Korean Patent Application No. 10-2013-0020470, filed on Feb. 26, 2013, in the Korean Intellectual Property Office. All disclosures of the document(s) named above are incorporated herein by reference.

BACKGROUND OF THE INVENTION

1. Field of the Invention

The present invention relates to a video signal processing apparatus and method; and more particularly, to a video signal processing apparatus and method capable of automatically recognizing whether an input video signal is an analog video signal or a digital video signal and processing the input video signal.

2. Description of the Related Art

Recently, video signals and display devices have generally switched from an analog format to a digital format as terrestrial analog broadcasting has terminated. However, apparatuses that generate an analog video signal, such as analog video cameras, are still in use.

Therefore, there are demands for an apparatus and method for transforming an input analog video signal into a digital video signal that can be handled by a digital display device or a digital storage device.

However, in some cases, whether an input video signal is an analog signal or a digital signal cannot be determined. Therefore, there is a need to develop an apparatus and method capable of automatically determining whether an input signal is an analog signal or a digital signal so as to process the input signal appropriately.

SUMMARY OF THE INVENTION

To solve the problem described above, the present invention provides a video signal processing apparatus and method capable of automatically recognizing whether an input video signal is an analog video signal or a digital video signal and processing the input video signal accordingly.

According to one aspect of the present invention, there is provided a video signal processing apparatus configured to process an input video signal by automatically determining whether the input video signal is a digital video signal or an analog video signal having a frequency lower than that of the digital video signal, the video signal processing apparatus including: a filter configured to pass the analog video signal and block the digital video signal; a digital video processor configured to generate a first video signal by processing the digital video signal and output a first flag signal indicating whether the first video signal is generated; a distribution unit configured to distribute the input video signal to the filter and the digital video processor; an analog video processor configured to generate a second video signal by processing the analog video signal passed through the filter and output a second flag signal indicating whether the second video signal is generated; a video signal selector configured to select and output the first video signal or the second video signal; and a controller configured to control the video signal selector to select one of the first video signal and the second video signal based on the first flag signal and the second flag signal.

The analog video processor may include an analog-to-digital converter configured to generate the second video signal by subjecting the analog video signal to an analog-to-digital conversion.

The digital video signal may include a serial digital interface (SDI) signal.

The SDI signal may include one of a HD-SDI signal and a 3G-SDI signal.

The controller may be configured to control the video signal selector to select and output the first video signal when the first flag signal indicates the first video signal is generated, or the second video signal when the second flag signal indicates the second video signal is generated.

The video signal processing apparatus may further include a display unit configured to receive one of the first video signal and the second video signal.

The display unit may include a display monitor.

The display unit may include a liquid crystal display (LCD) panel.

The video signal processing apparatus may further include a video storage unit configured to receive the first video signal and the second video signal and store video data included therein.

The video storage unit may include a digital video recorder (DVR).

According to another aspect of the present invention, there is provided a video processing method of processing an input video signal by automatically determining whether the input video signal is a digital video signal or an analog video signal having a frequency lower than that of the digital video signal, the video processing method including: (a) distributing the input video signal; (b) blocking the input video signal when the input video signal distributed in the step (a) is the digital video signal, and passing the input video signal when the input video signal distributed in the step (a) is the analog video signal; (c) inputting the input video signal to a digital video processor when the input video signal is blocked in the step (b) to generate a first video signal and a first flag signal indicating whether the first video signal is generated, and inputting the input video signal to an analog video processor when the input video signal is passed in the step (b) to generate a second video signal and a second flag signal indicating whether the second video signal is generated; and (d) selecting and outputting the first video signal or the second video signal based on the first flag signal and the second flag signal.

The analog video processor may generate the second video signal by subjecting the analog video signal to an analog-to-digital conversion.

The digital video signal may include a SDI signal.

The SDI signal may include one of a HD-SDI signal and a 3G-SDI signal.

The step (d) may include selecting and outputting the first video signal when the first flag signal indicates the first video signal is generated, or the second video signal when the second flag signal indicates the second video signal is generated.

The step (d) may include selecting and outputting the first video signal or the second video signal to a display unit.

The display unit may include a display monitor.

The display unit may include a LCD panel.

The step (d) may include selecting and outputting the first video signal or the second video signal to a video storage unit.

The video storage unit may include a DVR.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Hereinafter, a video signal processing apparatus and method according to exemplary embodiments of the present invention will be described in detail with reference to the accompanying drawings.

Figure 1:
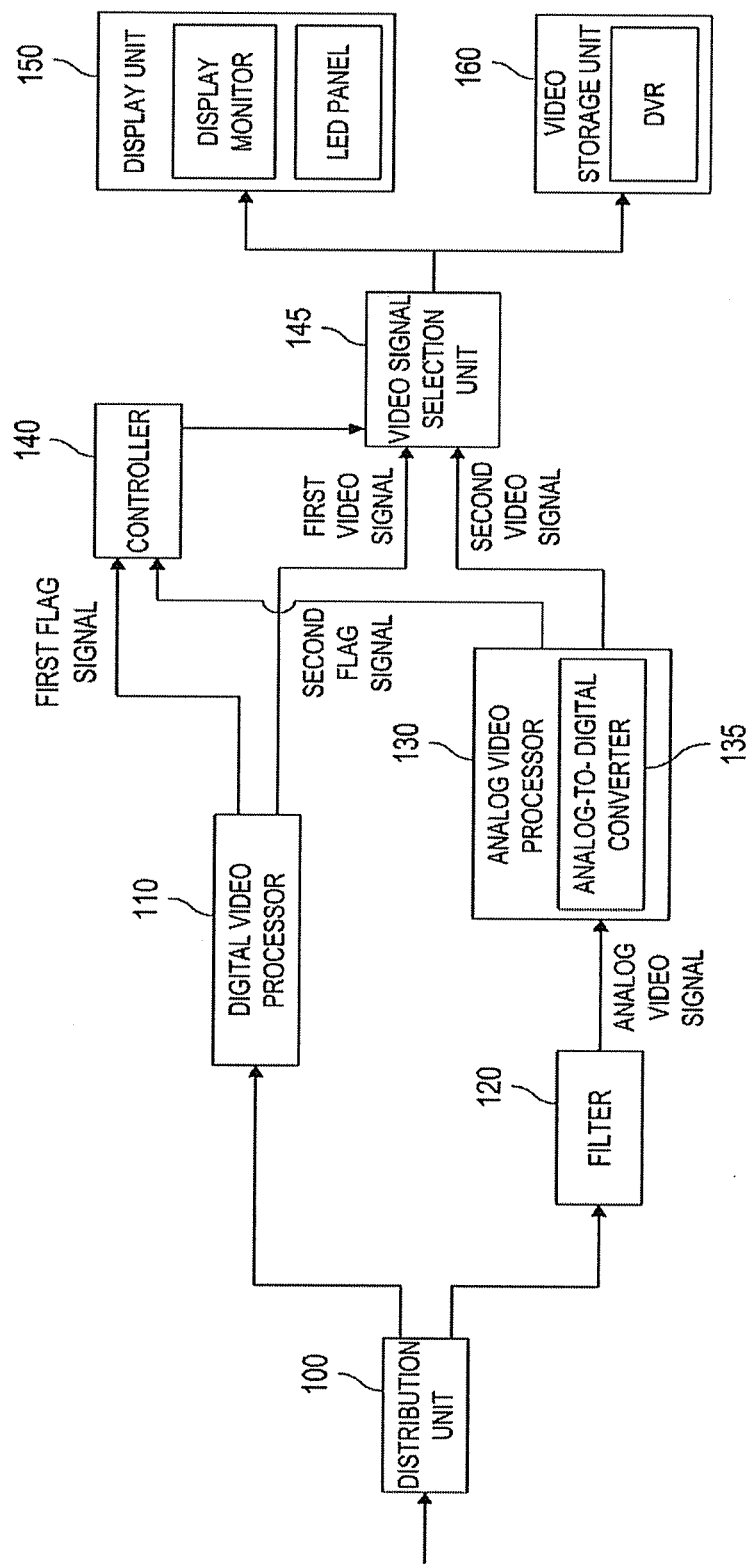
FIG. 1 is a block diagram of a video signal processing apparatus according to an embodiment of the present invention.

FIG. 1 is a block diagram of a video signal processing apparatus according to an embodiment of the present invention.

Referring to FIG. 1, the video signal processing apparatus according to the present invention includes a distribution unit 100, a digital video processor 110, a filter 120, an analog video processor 130, a controller 140, and a video signal selector 145. The analog video processor 130 includes an analog-to-digital converter 135.

The video signal processing apparatus according to an embodiment of the present invention may further include at least one of a display unit 150 and a video storage unit 160. The display unit 150 may be a standalone display monitor or a liquid crystal display (LCD) panel. The video storage unit 160 may be a digital video recorder (DVR).

An input video signal is received via an input terminal of the distribution unit 100. The input video signal is either a digital video signal or an analog video signal. A frequency range of the digital video signal is higher than that of the analog video signal. Hereinafter, the frequency range to which the frequency of the digital video signal belongs and the frequency range to which the frequency of the analog video signal belongs will be referred to as a high-frequency band and a low-frequency band, respectively.

An output terminal of the distribution unit 100 is connected to the digital video processor 110 and the filter 120. The distribution unit 100 may distribute the input video signal by branching a video signal transmission line such as a coaxial cable into two lines.

When the video signal processing apparatus receives an input video signal from the outside, the distribution unit 100 distributes the input video signal into two equal input video signals. Then, the distribution unit 100 transmits the two equal input video signals to the filter 120 and the digital video processor 110, respectively.

The digital video processor 110 receives the input video signal transmitted from the distribution unit 100 and performs digital video signal processing on the input video signal. The digital video processor 110 may include at least one integrated circuit.

When the input video signal is a digital video signal, the digital video processor 110 processes the digital video signal received from the distribution unit 100 to generate a first video signal. When the first video signal is generated, the digital video processor 110 outputs, e.g., a logic high signal as a first flag signal so that the first flag signal indicates the first video signal is generated.

The digital video signal may be a serial digital interface (SDI) signal, e.g., a high-definition (HD)-SDI signal or a 3 Gbps (3G)-SDI signal.

The first video signal may cause the display unit 150 to be driven. Also, the first video signal may include video data that can be stored in the video storage unit 160. When the digital video signal is a SDI signal, the digital video processor 110 may deserialize the SDI signal to generate the first video signal.

When the input video signal is in a low-frequency band, the digital video processor 110 cannot recognize the input video signal and thus does not operate. Therefore, when the input video signal is an analog signal, the digital video processor 110 does not operate and thus the first video signal is not generated. When the first video signal is not generated, the digital video processor 110 outputs, e.g., a logic low signal as the first flag signal so that the first flag signal indicates the first video signal is not generated.

The filter 120 passes the input video signal when the input video signal transmitted from the distribution unit 100 is in a low-frequency band signal. The filter 120 blocks the input video signal when the input video signal transmitted from the distribution unit 100 is in a high-frequency band signal. The filter 120 may include a low-pass filter having an operational amplifier.

When the input video signal is a high-frequency digital video signal, the input video signal received from the distribution unit 100 is blocked by the filter 120 and is thus not input to the analog video processor 130.

When the input video signal is an analog video signal, the input video signal received from the distribution unit 100 passes through the filter 120 and then is input to the analog video processor 130.

The analog video processor 130 processes the analog video signal having passed through the filter 120. In detail, the analog video processor 130 may include an analog-to-digital converter 135 configured to convert the analog video signal into the digital video signal.

The analog video processor 130 processes the analog video signal received from the filter 120 to generate a second video signal. When the second video signal is generated, the analog video processor 130 outputs, e.g., a logic high signal as a second flag signal so that the second flag signal indicates the second video signal is generated.

The second video signal may cause the display unit 150 to be driven. Also, the second video signal may include video data that can be stored in the video storage unit 160. The above description regarding the first video signal may also be applied to the second video signal.

When the input video signal is a digital video signal, the input video signal is blocked by the filter 120 and thus the second video signal is not generated. When the second video signal is not generated, the analog video processor 130 outputs, e.g., a logic low signal as the second flag signal so that the second flag signal indicates the second video signal is not generated.

The controller 140 receives the first flag signal and the second flag signal from the digital video processor 110 and the analog video processor 130, respectively.

When the first flag signal indicates that the first video signal is generated, the controller 140 controls the video signal selector 145 to select and output the first video signal. When the second flag signal indicates that the second video signal is generated, the controller 140 controls the video signal selector 145 to select and output the second video signal.

The input video signal is either a digital video signal or an analog video signal. That is, the input video signal cannot be both the digital video signal and the analog signal at the same time. Thus, the first video signal and the second video signal cannot be generated simultaneously. That is, when one of the first and second video signals is generated, the other video signal is not generated. Therefore, the first flag signal indicating that the first video signal is generated and the second flag signal indicating that the second video signal is generated cannot be generated at the same time.

The video signal selector 145 receives an output signal of the digital video processor 110 or the analog video processor 130, i.e., the first video signal or the second video signal. An output signal of the video signal selector 145 is supplied to the display unit 150 or the video storage unit 160.

Under control of the controller 140, the video signal selector 145 outputs the first video signal when the digital video processor 110 generates the first video signal and outputs the second video signal when the analog video processor 130 generates the second video signal.

The display unit 150 receives the first video signal or the second video signal and displays a video.

The video storage unit 160 stores the video data included in the first video signal or the second video signal.

Figure 2:
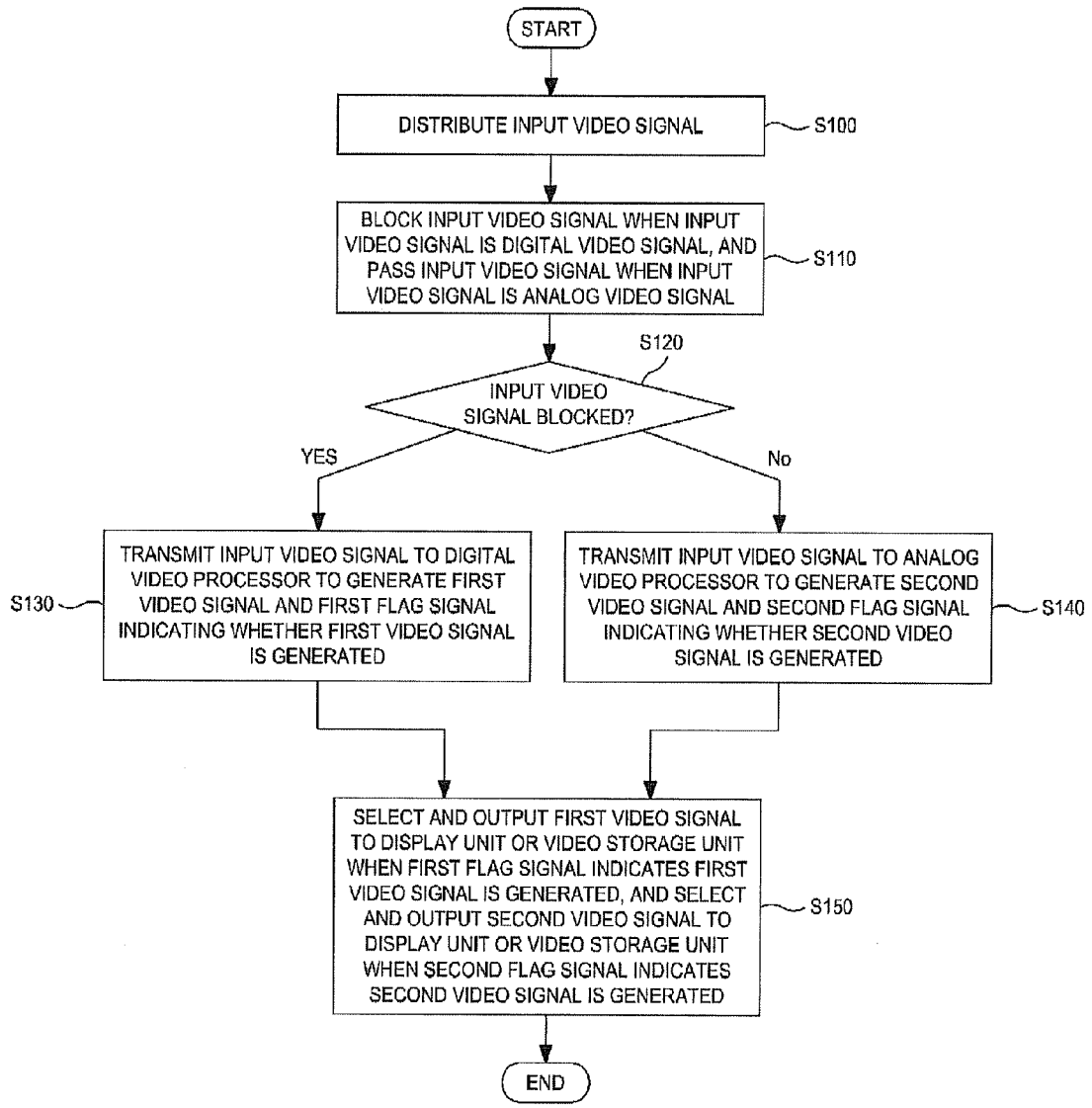
FIG. 2 is a flowchart of a video signal processing method according to an embodiment of the present invention.

FIG. 2 is a flowchart of a video signal processing method according to an embodiment of the present invention. The video signal processing method according to an embodiment of the present invention will be described in detail with reference to FIG. 2 below.

The video signal processing method according to an embodiment of the present invention may be performed by a video signal processing apparatus that includes a digital video processor and an analog video processor.

When the video signal processing apparatus receives an input video signal, the input video signal is distributed into two equal input video signals (step S100).

The input video signal is blocked when the input video signal distributed in step S100 is a digital video signal, and passes when the input video signal distributed in step S100 is an analog video signal (step S110). The digital video signal may be an SDI signal, e.g., a HD-SDI signal or a 3G-SDI signal.

When the input video signal is blocked in step S110 ('YES' in step S120), the input video signal is input to the digital video processor. When the input video signal is input to the digital video processor, the digital video processor processes the input video signal to generate a first video signal and outputs a signal indicating the generation of the first video signal as a first flag signal (step S130).

When the input video signal is passed in step S110 ('NO' in step S120), the input video signal is input to the analog video processor. When the input video signal is input to the analog video processor, the analog video processor processes the input video signal to generate a second video signal, and outputs a signal indicating the generation of the second video signal as a second flag signal (step S140).

Here, the first video signal, the second video signal, the first flag signal and the second flag signal are the same as those described in the above description of the video signal processing apparatus and are thus not redundantly described here.

In step S140, the analog video processor may subject the analog video signal to an analog-to-digital conversion to generate the second video signal.

The input video signal is either a digital video signal or an analog video signal. That is, the input video signal cannot be both the digital video signal and the analog video signal at the same time. Thus, only one of steps S130 and S140 can be performed. Accordingly, only one of the first video signal and the second video signal is generated.

Then, the first video signal is output when the first flag signal indicates that the first video signal is generated, and the second video signal is output when the second flag signal indicates that the second video signal is generated (step S150).

In step S150, the first video signal or the second video signal may be output to a display unit. The display unit may be a display monitor or an LCD panel.

In step S150, the first video signal or the second video signal may be output to a video storage unit. The video storage unit may be a DVR.

A video signal processing apparatus and method according to the present invention are capable of automatically recognizing whether an input video signal is an analog video signal or a digital video signal and processing the input video signal accordingly.

Thus, the input signal can be processed appropriately so that a display device can display a video or a video storage device can store a video data even when it is not known whether the input signal is an analog signal or a digital signal.

Further, the analog video signal or the digital video signal can be automatically recognized to be processed even when an analog video signal or a digital video signal is input via a common input terminal.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A video signal processing apparatus configured to process an input video signal by automatically determining whether the input video signal is a digital video signal or an analog video signal having a frequency lower than that of the digital video signal, the video signal processing apparatus comprising:
   a filter configured to pass the analog video signal and block the digital video signal; a digital video processor configured to generate a first video signal by processing the digital video signal and output a first flag signal indicating whether the first video signal is generated;
   a distribution unit configured to distribute the input video signal to the filter and the digital video processor;
   an analog video processor configured to generate a second video signal by processing the analog video signal passed through the filter and output a second flag signal indicating whether the second video signal is generated;
   a video signal selector configured to select and output the first video signal or the second video signal; and
   a controller configured to control the video signal selector to select one of the first video signal and the second video signal based on the first flag signal and the second flag signal.

2. The video signal processing apparatus of claim 1, wherein the analog video processor comprises an analog-to-digital converter configured to generate the second video signal by subjecting the analog video signal to an analog-to-digital conversion.

3. The video signal processing apparatus of claim 1, wherein the digital video signal comprises a serial digital interface (SDI) signal.

4. The video signal processing apparatus of claim 3, wherein the SDI signal comprises one of a HD-SDI signal and a 3G-SDI signal.

5. The video signal processing apparatus of claim 1, wherein the controller is configured to control the video signal selector to select and output the first video signal when the first flag signal indicates the first video signal is generated or the second video signal when the second flag signal indicates the second video signal is generated.

6. The video signal processing apparatus of claim 1, further comprising a display unit configured to receive one of the first video signal and the second video signal.

7. The video signal processing apparatus of claim 6, wherein the display unit comprises a display monitor.

8. The video signal processing apparatus of claim 6, wherein the display unit comprises a liquid crystal display (LCD) panel.

9. The video signal processing apparatus of claim 1, further comprising a video storage unit configured to receive the first video signal and the second video signal and store video data included therein.

10. The video signal processing apparatus of claim 9, wherein the video storage unit comprises a digital video recorder (DVR).

11. A video processing method of processing an input video signal by automatically determining whether the input video signal is a digital video signal or an analog video signal having a frequency lower than that of the digital video signal, the video processing method comprising:
    (a) distributing the input video signal;
    (b) blocking the input video signal when the input video signal distributed in the step (a) is the digital video signal, and passing the input video signal when the input video signal distributed in the step (a) is the analog video signal;
    (c) inputting the input video signal to a digital video processor when the input video signal is blocked in the step (b) to generate a first video signal and a first flag signal indicating whether the first video signal is generated, and inputting the input video signal to an analog video processor when the input video signal is passed in the step (b) to generate a second video signal and a second flag signal indicating whether the second video signal is generated; and
    (d) selecting and outputting the first video signal or the second video signal based on the first flag signal and the second flag signal.

12. The video signal processing method of claim 11, wherein the analog video processor generates the second video signal by subjecting the analog video signal to an analog-to-digital conversion.

13. The video signal processing method of claim 11, wherein the digital video signal comprises a SDI signal.

14. The video signal processing method of claim 13, wherein the SDI signal comprises one of a HD-SDI signal and a 3G-SDI signal.

15. The video signal processing method of claim 11, wherein the step (d) comprises selecting and outputting the first video signal when the first flag signal indicates the first video signal is generated or the second video signal when the second flag signal indicates the second video signal is generated.

16. The video signal processing method of claim 11, wherein the step (d) comprises selecting and outputting the first video signal or the second video signal to a display unit.

17. The video signal processing method of claim 16, wherein the display unit comprises a display monitor.

18. The video signal processing method of claim 16, wherein the display unit comprises a LCD panel.

19. The video signal processing method of claim 11, wherein the step (d) comprises selecting and outputting the first video signal or the second video signal to a video storage unit.

20. The video signal processing method of claim 19, wherein the video storage unit comprises a DVR.

* * * * *